United States Patent
Arimilli et al.

(10) Patent No.: US 10,346,574 B2
(45) Date of Patent: Jul. 9, 2019

(54) EFFECTIVE SUBSTITUTION OF GLOBAL DISTRIBUTED HEAD SWITCH CELLS WITH CLUSTER HEAD SWITCH CELLS

(71) Applicant: QUALCOMM Incorporated, San Diego, CA (US)

(72) Inventors: Rajesh Arimilli, Bangalore (IN); Sabyasachi Sarkar, Bangalore (IN); Gaurav Arya, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/625,754

(22) Filed: Jun. 16, 2017

(65) Prior Publication Data

US 2018/0366367 A1 Dec. 20, 2018

(51) Int. Cl.
   *G06F 17/50* (2006.01)
   *H01L 27/00* (2006.01)
   *H01L 21/768* (2006.01)
   *H01L 27/02* (2006.01)
   *H01L 27/118* (2006.01)

(52) U.S. Cl.
   CPC ...... *G06F 17/5072* (2013.01); *G06F 17/5068* (2013.01); *H01L 21/768* (2013.01); *H01L 27/0207* (2013.01); *G06F 2217/64* (2013.01); *G06F 2217/66* (2013.01); *H01L 27/11807* (2013.01); *H01L 2027/11881* (2013.01)

(58) Field of Classification Search
   None
   See application file for complete search history.

(56) References Cited

U.S. PATENT DOCUMENTS

| | | | |
|---|---|---|---|
| 6,480,989 B2 | 11/2002 | Chan et al. | |
| 7,466,620 B2 * | 12/2008 | Mohammad | G11C 5/147 365/227 |
| 7,490,302 B1 | 2/2009 | Rahman et al. | |
| 8,063,664 B2 * | 11/2011 | Chua-Eoan | G06F 1/3203 326/83 |
| 8,143,914 B2 * | 3/2012 | Ogata | H01L 27/0207 326/41 |
| 8,504,967 B2 * | 8/2013 | Suzuki | G06F 1/3287 716/120 |
| 9,059,696 B1 | 6/2015 | Rahman | |
| 9,582,068 B2 | 2/2017 | Tiwari et al. | |
| 10,170,578 B2 * | 1/2019 | Bartley | H01L 29/66234 |
| 2006/0184808 A1 * | 8/2006 | Chua-Eoan | G06F 1/3203 713/300 |
| 2017/0033796 A1 | 2/2017 | Cao et al. | |
| 2018/0218106 A1 * | 8/2018 | Delk | G06F 17/5077 |
| 2018/0218107 A1 * | 8/2018 | Delk | G06F 17/5081 |

* cited by examiner

*Primary Examiner* — Leigh M Garbowski
(74) *Attorney, Agent, or Firm* — Arent Fox, LLP and Qualcomm Incorporated

(57) ABSTRACT

An IC includes a first IC portion and a second IC portion. The IC includes a first set of standard cells in the first IC portion. The IC includes a plurality of memory cells and a second set of standard cells in the second IC portion. The second set of standard cells is located in channels between the memory cells. The IC further includes a plurality of GDHS cells in the first IC portion. The GDHS cells are configured to switch power on and to switch power off to the first set of standard cells. The IC further includes a plurality of CHS cells in the first IC portion. The CHS cells are configured to switch power on and to switch power off to the second set of standard cells in the second IC portion.

12 Claims, 4 Drawing Sheets

EFFECTIVE SUBSTITUTION OF GLOBAL DISTRIBUTED HEAD SWITCH CELLS WITH CLUSTER HEAD SWITCH CELLS

BACKGROUND

Field

The present disclosure relates generally to memory designs, and more particularly, to effective substitution of global distributed head switch (GDHS) cells with cluster head switch (CHS) cells for optimal memory/intellectual property (IP) core channel area.

Background

An IP core is a logic block that is used in making an application-specific integrated circuit (IC) (ASIC). ASICs may include memory cells and standard logic cells. There is currently a need to reduce a size/area of ASICs and/or increase a density of memory cells/standard logic cells in ASICs.

SUMMARY

In an aspect of the disclosure, an IC includes a first IC portion and a second IC portion. The IC includes a first set of standard cells in the first IC portion. The IC further includes a plurality of memory cells and a second set of standard cells in the second IC portion. The second set of standard cells is located in channels between the memory cells. The IC further includes a plurality of GDHS cells in the first IC portion. The GDHS cells are configured to switch power on and to switch power off to the first set of standard cells. The IC further includes a plurality of CHS cells in the first IC portion. The CHS cells are configured to switch power on and to switch power off to the second set of standard cells in the second IC portion.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc.

Figure 1:
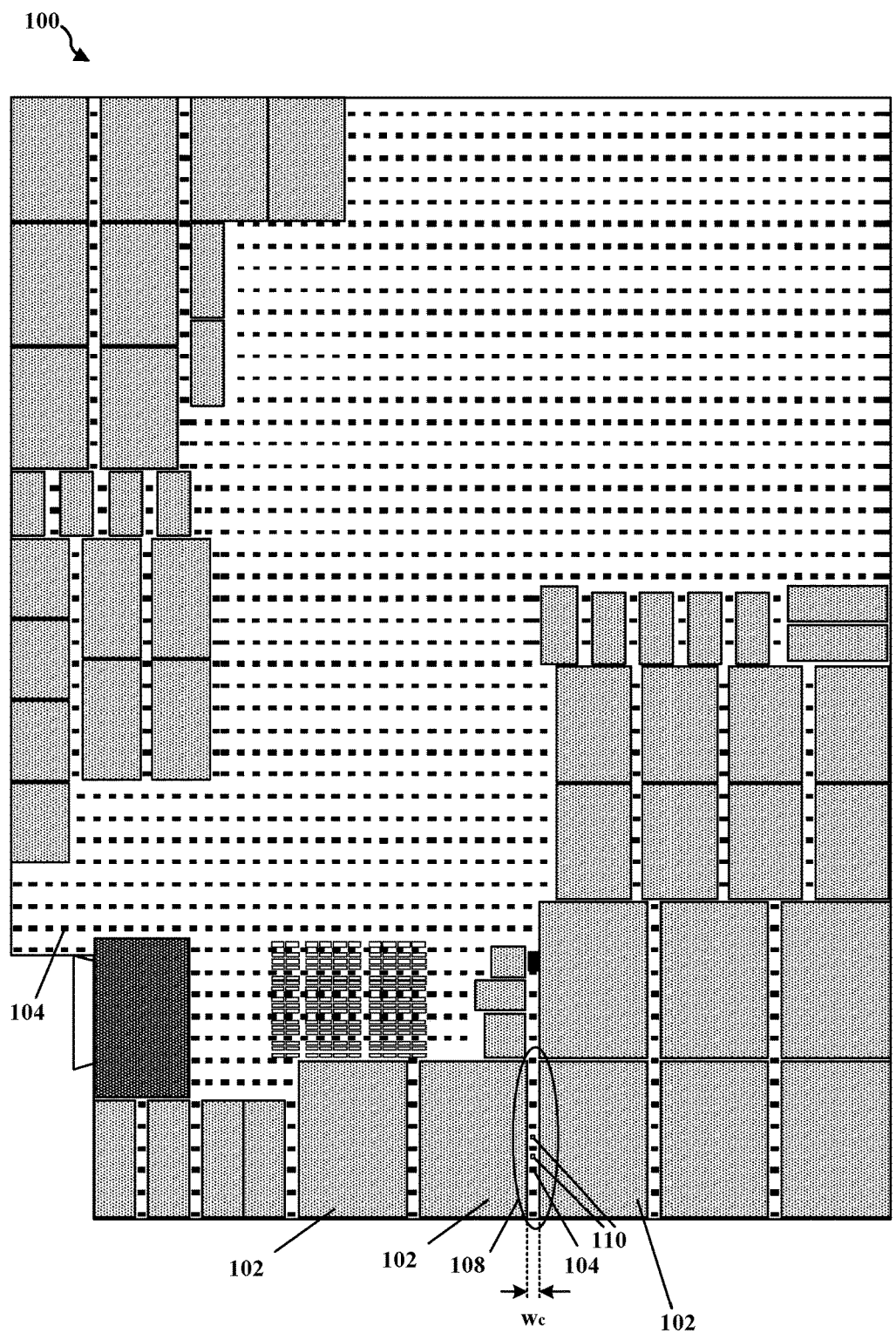
FIG. 1 is a diagram illustrating an IP core including memory cells and GDHS cells.

FIG. 1 is a diagram illustrating an IP core 100 including memory cells 102 and GDHS cells 104. As illustrated in FIG. 1, the IP core 100 includes a plurality of memory cells 102. The memory cells 102 are spaced from each other to provide memory channels 108 between the memory cells 102. The memory channels 108 are used to avoid timing design rule check (DRC) violations and hold violations. Standard logic cells 110 and GDHS cells 104 are located within the memory channels 108. The GDHS cells 104 within the memory channels 108 provide course-grain power gating to the standard logic cells 110 within the memory channels 108. The standard logic cells 110 have only about a 5%-10% cell density within the memory channels 108. The GDHS cells 104 have a width $w_{gdhs}$. As such, a channel width $w_c$ of the memory channels 108 must be greater than the GDHS cell width $w_{gdhs}$. An IP core may include many memory cells 102. For example, an IP core may have a density of 50% or more of memory cells 102. Because the channel width $w_c$ of the memory channels 108 is constrained by the GDHS cell width $w_{gdhs}$ (in this case, the channel width $w_c$ may also be constrained by power/ground requirements), and because the density of the standard logic cells 110 is fairly low (5% to 10%) in the memory channels 108, there is some wasted space in the IP core 100 due to the memory channels 108.

Figure 2:
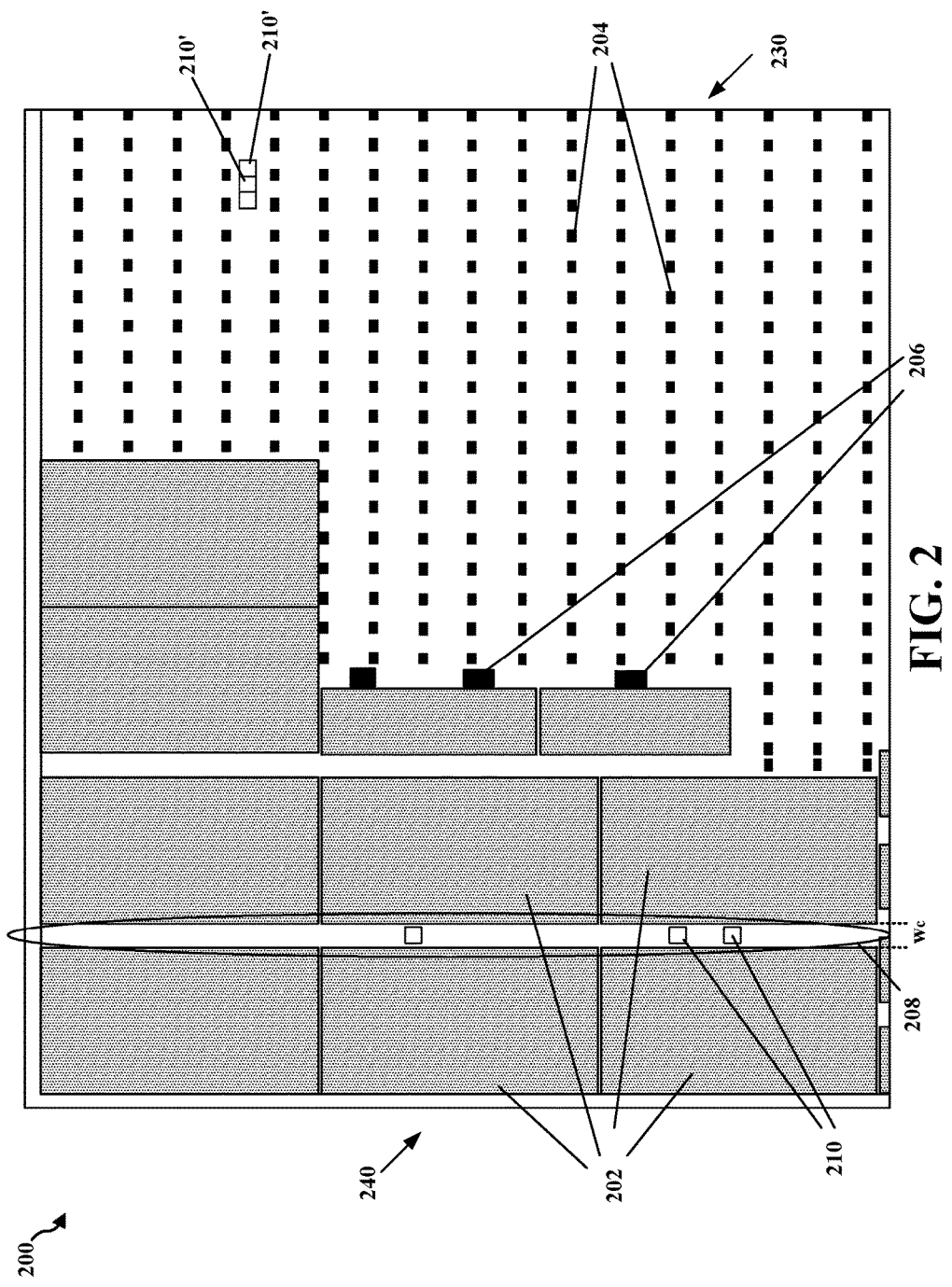
FIG. 2 is a diagram illustrating an exemplary IP core including memory cells, GDHS cells, and CHS cells.

FIG. 2 is a diagram illustrating an exemplary IP core 200 including memory cells 202, GDHS cells 204, and CHS cells 206. As illustrated in FIG. 2, GDHS cells 204 are not located in the memory channels 208. Instead, CHS cells 206 are used as fine-grain power gating for the standard logic cells 210 located in the memory channels 208. The IP core 200 includes a first IC portion 230 (the portion without the memory cells 202) and a second IC portion 240 (the portion including the memory cells 202). The first IC portion 230 includes a first set of standard cells 210', GDHS cells 204, and CHS cells 206. Only a few standard cells 210' are illustrated in FIG. 2 for simplicity. However, the first IC portion 230 is filled with such standard cells 210'. The GDHS cells 204 provide course-grain power gating for switching power on/off to the first set of standard cells 210'. The second IC portion 240 includes the memory cells 202 and a second set of standard cells 210 within the memory channels 208 of the memory cells 202. The CHS cells 206 provide fine-grain power gating for switching power on/off to the second set of standard cells 210. The CHS cells 206 may be located close to the memory channels 208 on edges of the first IC portion 230. The CHS cells 206 may be connected to power/ground in the memory channels 208 through a redistribution layer (RDL) located adjacent the IP core 200. The area within the memory channels 208 may have custom Vdd (power for p-type metal oxide semiconductor (MOS) (pMOS) transistors) and Vss (power for n-type MOS (nMOS) transistors) pitch.

Removing use of the GDHS cells 204 for power gating the standard cells 210 in the memory channels 208 may cause an IR drop degradation (e.g., approximately around 2% on average) in association with powering the standard cells 210 in the memory channels 208. However, use of the CHS cells 206 for power gating the standard cells 210 in the memory channels 208 may reduce or completely negate the IR drop degradation. As GDHS cells 204 are not located in the memory channels 208, the channel width $w_c$ of the memory channels 208 may be dictated by the average drive strength of buffers located in the standard logic cells 210 of the memory channels 208 (and may also be dictated by power/ground requirements). Accordingly, the channel width $w_c$ of the memory channels 208 of the IP core 200 may be reduced in comparison to the channel width $w_c$ of the memory channels 108 of the IP core 100. Reducing the channel width $w_c$ decreases the size/area of the IP core (e.g., by 0.015 mm$^2$) and/or increases a cell density (e.g., by 5%) of the IP core 200. The size/area of the IP core 200 is decreased and/or a cell density of the IP core 200 is increased at the expense of a possible increase in the IR drop in association with powering the standard cells 210 in the memory channels 208.

Figure 3:
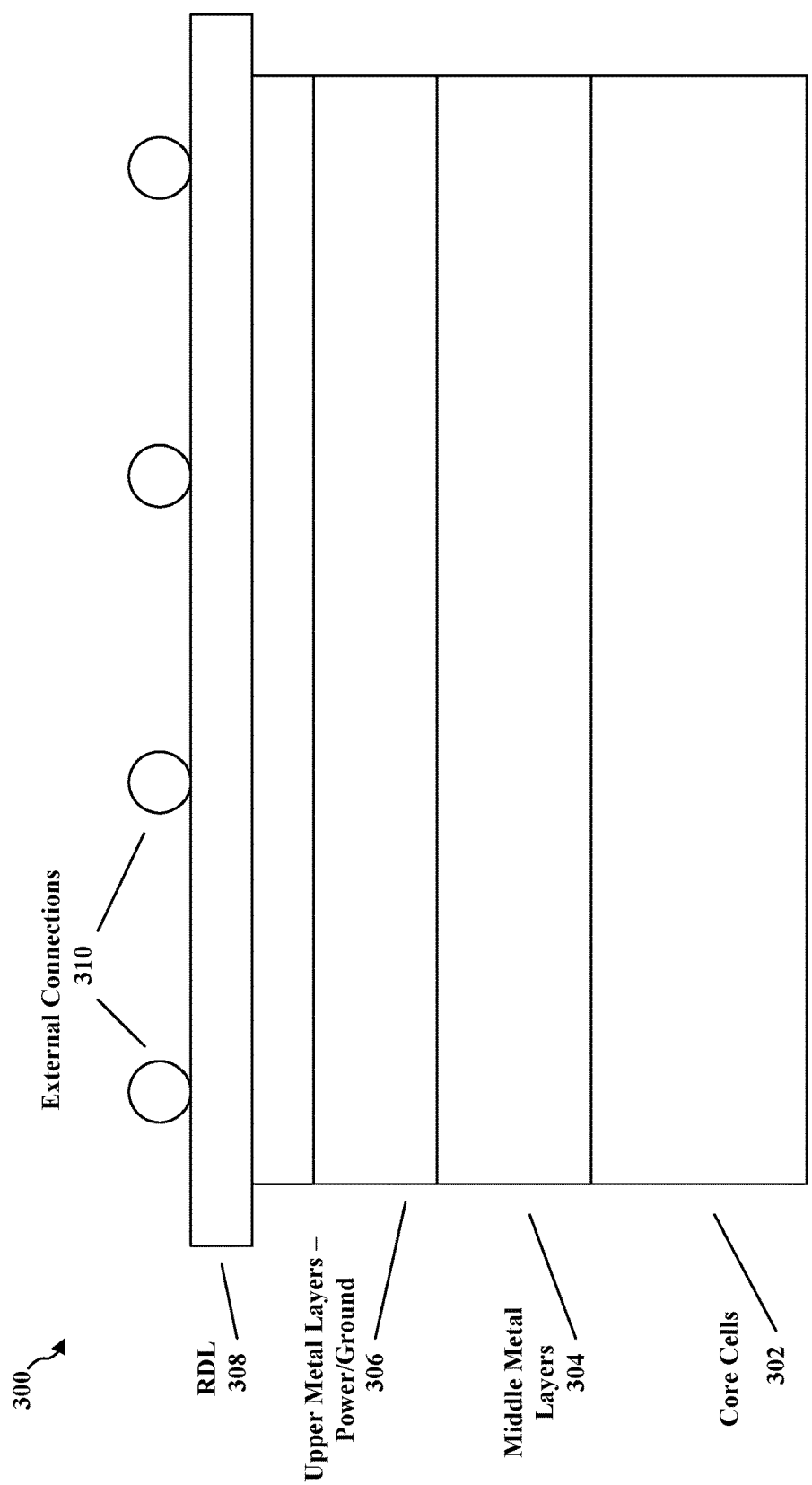
FIG. 3 is a diagram conceptually illustrating a side profile of an IC.

FIG. 3 is a diagram conceptually illustrating a side profile of an IC 300. The IC 300 includes core cells 302. The core cells 302 include memory cells 202, standard logic cells 210, 210', and metal layers used for internal wiring of the core cells 302. Above the core cells 302 are middle metal layers 304 used for global routing across the IC 300. Above the middle metal layers 304 are upper metal layers 306 used for power/ground (a power distribution network; e.g., a power/ground mesh) for powering the core cells 302. Above the upper metal layers 306 is an RDL layer 308, which may be used to redistribute signal lines across the IC 300. External connections 310 (e.g., solder balls, wire bonds, etc.) may be made through the RDL 308. As discussed supra, the CHS cells 206 (within the core cells 302) may be connected to power/ground (in upper metal layers 304) in the memory channels 208 through the RDL 308 of the IC 300.

Referring again to FIGS. 2, 3, an IC 300 includes a first IC portion 230 and a second IC portion 240. The IC 300 includes a first set of standard cells 210' in the first IC portion 230. The IC 300 includes a plurality of memory cells 202 and a second set of standard cells 210 in the second IC portion 240. The second set of standard cells 210 are located in channels 208 between the memory cells 202. The IC 300 further includes a plurality of GDHS cells 204 in the first IC portion 230. The GDHS cells 204 are configured to switch power on and to switch power off to the first set of standard cells 210'. The IC 300 further includes a plurality of CHS cells 206 in the first IC portion 230. The CHS cells 206 are configured to switch power on and to switch power off to the second set of standard cells 210 in the second IC portion 240. The CHS cells 206 may be located on edges of the first IC portion 230 (that do not include memory cells 202) adjacent the second IC portion 240 (that does include memory cells 202). A power distribution network 306 may extend across the IC. An RDL 308 may be located above the power distribution network 306. The GDHS cells 204 and the CHS cells 206 (within the core cells 302) may be located below the power distribution network 306 and may be coupled to the power distribution network 306. The CHS cells 206 may be coupled to the second set of standard cells 210 through the RDL 308.

Figure 4:
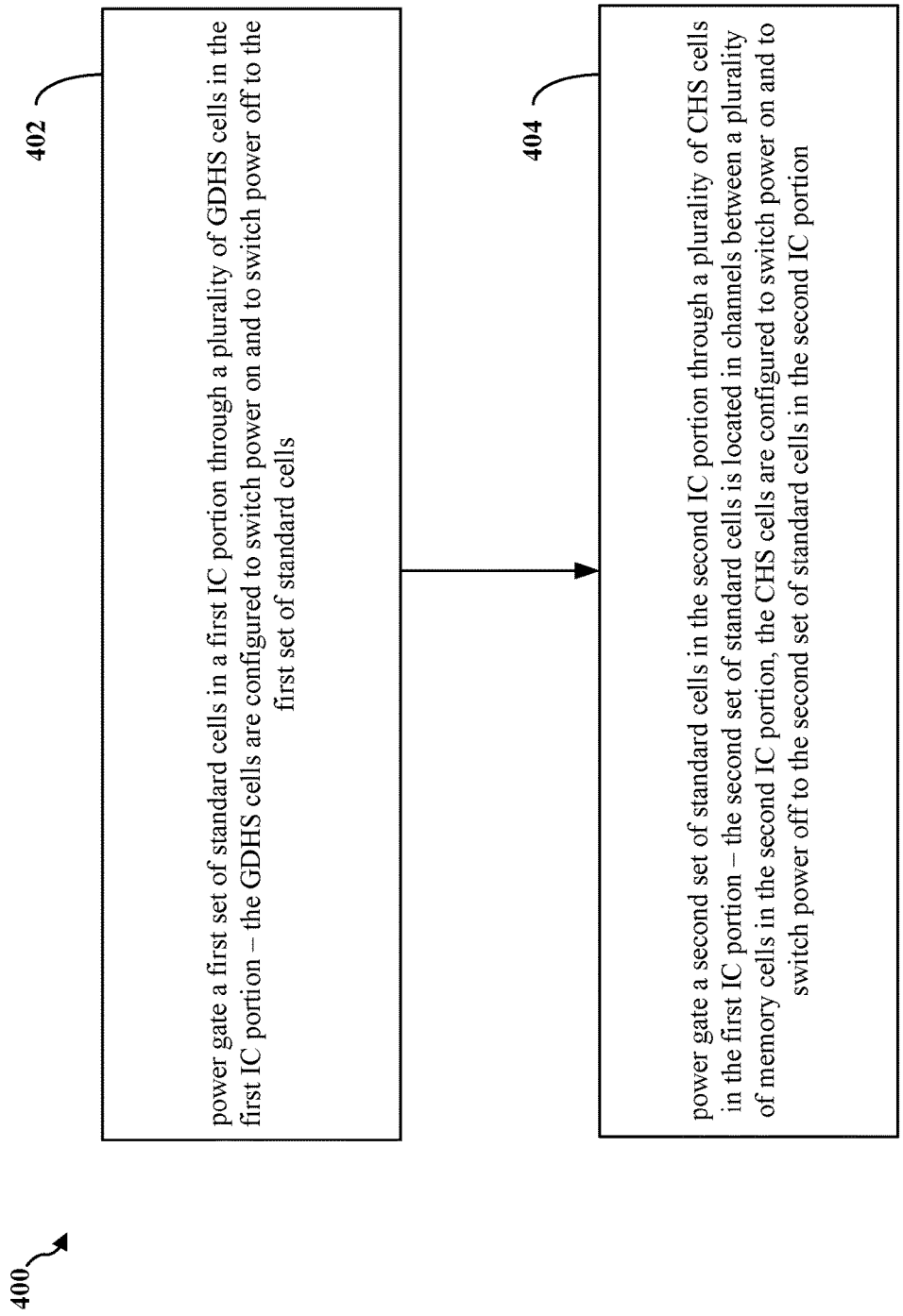
FIG. 4 is a diagram illustrating a method of operating an exemplary IC apparatus.

FIG. 4 is a diagram 400 illustrating a method of operating an exemplary IC apparatus. Specifically, diagram 400 illustrates a method of power gating of an IC 300 including a first IC portion 230 and a second IC portion 240. At 402, a first set of standard cells 210' in the first IC portion 230 (which excludes memory cells) is power gated through a plurality of GDHS cells 204 in the first IC portion 230. The GDHS cells 204 are configured to switch power on and to switch power off to the first set of standard cells 210'. At 404, a second set of standard cells 210 in the second IC portion 240 is power gated through a plurality of CHS cells 206 in the first IC portion 230. The second set of standard cells 210 is located in channels 208 between a plurality of memory cells 202 in the second IC portion 240. The CHS cells 206 are configured to switch power on and to switch power off to the second set of standard cells 210 in the second IC portion 240. In one configuration, the CHS cells 206 are located on edges of the first IC portion 230 adjacent the second IC portion 240. In one configuration, the IC 300 includes a power distribution network 306 extending across the IC 300. The IC 300 may further include an RDL 308 above the power distribution network 306. The GDHS cells 204 and the CHS cells 206 may be located below the power distribution network 306 and may be coupled to the power distribution network 306. The CHS cells 206 may be coupled to the second set of standard cells 210 through the RDL 308.

In one configuration, an apparatus for power gating of an IC 300 includes a first IC portion 230 and a second IC portion 240. The apparatus includes means for power gating a first set of standard cells 210' in the first IC portion 230 through a plurality of GDHS cells 204 in the first IC portion 230. The GDHS cells 204 are configured to switch power on and to switch power off to the first set of standard cells 210'. The apparatus further includes means for power gating a second set of standard cells 210 in the second IC portion 240 through a plurality of CHS cells 206 in the first IC portion 230. The second set of standard cells 210 is located in channels 208 between a plurality of memory cells 202 in the second IC portion 240. The CHS cells 206 are configured to switch power on and to switch power off to the second set of standard cells 210 in the second IC portion 240.

As discussed supra, CHS cells are used instead of GDHS cells to provide power gating to standard logic cells located in memory channels between memory cells on an IC. The CHS cells may be located in a non-memory portion of the IC, adjacent a memory portion of the IC. Accordingly, no power-gating cells may be used in some or all of the memory channels of an IC. The removal of the GDHS cells from the memory channels of an IC allows for a width of the memory channels to be reduced, and consequently, provides for a decrease in a size/area of an IC and/or increases a cell density in the IC. However, as a result, there may be an IR drop degradation when power gating the standard logic cells within the memory channels. Use of CHS cells for power gating the standard logic cells with the memory channels may partially or entirely negate the IR drop degradation.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C.

Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An integrated circuit (IC) including a first IC portion and a second IC portion, comprising:
    a first set of logic cells in the first IC portion;
    a plurality of memory cells and a second set of logic cells in the second IC portion, the second set of logic cells being located in channels between the memory cells;
    a plurality of global distributed head switch (GDHS) cells in the first IC portion, the GDHS cells being configured to switch power on and to switch power off to the first set of logic cells; and
    a plurality of cluster head switch (CHS) cells in the first IC portion, the CHS cells being configured to switch power on and to switch power off to the second set of logic cells in the second IC portion.

2. The IC of claim 1, wherein the CHS cells are located on edges of the first IC portion adjacent the second IC portion.

3. The IC of claim 1, further comprising:
    a power distribution network extending across the IC; and
    a redistribution layer (RDL) above the power distribution network,
    wherein the GDHS cells and the CHS cells are located below the power distribution network and are coupled to the power distribution network, and
    wherein the CHS cells are coupled to the second set of logic cells through the RDL.

4. The IC of claim 1, wherein the first IC portion excludes memory cells.

5. A method of power gating of an integrated circuit (IC) including a first IC portion and a second IC portion, comprising:
    power gating a first set of logic cells in the first IC portion through a plurality of global distributed head switch (GDHS) cells in the first IC portion, the GDHS cells being configured to switch power on and to switch power off to the first set of logic cells; and
    power gating a second set of logic cells in the second IC portion through a plurality of cluster head switch (CHS) cells in the first IC portion, the second set of logic cells being located in channels between a plurality of memory cells in the second IC portion, the CHS cells being configured to switch power on and to switch power off to the second set of logic cells in the second IC portion.

6. The method of claim 5, wherein the CHS cells are located on edges of the first IC portion adjacent the second IC portion.

7. The method of claim 5, wherein the IC comprises:
    a power distribution network extending across the IC; and
    a redistribution layer (RDL) above the power distribution network,
    wherein the GDHS cells and the CHS cells are located below the power distribution network and are coupled to the power distribution network, and
    wherein the CHS cells are coupled to the second set of logic cells through the RDL.

8. The method of claim 5, wherein the first IC portion excludes memory cells.

9. An apparatus for power gating of an integrated circuit (IC) including a first IC portion and a second IC portion, comprising:
    means for power gating a first set of logic cells in the first IC portion through a plurality of global distributed head switch (GDHS) cells in the first IC portion, the GDHS cells being configured to switch power on and to switch power off to the first set of logic cells; and
    means for power gating a second set of logic cells in the second IC portion through a plurality of cluster head switch (CHS) cells in the first IC portion, the second set of logic cells being located in channels between a plurality of memory cells in the second IC portion, the CHS cells being configured to switch power on and to switch power off to the second set of logic cells in the second IC portion.

10. The apparatus of claim 9, wherein the CHS cells are located on edges of the first IC portion adjacent the second IC portion.

11. The apparatus of claim 9, wherein the IC comprises:
    a power distribution network extending across the IC; and
    a redistribution layer (RDL) above the power distribution network,
    wherein the GDHS cells and the CHS cells are located below the power distribution network and are coupled to the power distribution network, and
    wherein the CHS cells are coupled to the second set of logic cells through the RDL.

12. The apparatus of claim 9, wherein the first IC portion excludes memory cells.

* * * * *